United States Patent [19]
Watabe

[11] 3,926,304
[45] Dec. 16, 1975

[54] STRETCH ADJUSTING DEVICE FOR A CONVEYOR IN A CONVEYOR-LINE WORKING SYSTEM

[75] Inventor: Ken Watabe, Hiroshima, Japan

[73] Assignee: Mitsubishi Jukogyo Kabushiki Kaisha, Tokyo, Japan

[22] Filed: Nov. 4, 1974

[21] Appl. No.: 520,903

[52] U.S. Cl. ............................................. 198/208
[51] Int. Cl.² ......................................... B65G 15/30
[58] Field of Search ........................... 198/208, 181

[56] References Cited
UNITED STATES PATENTS
2,578,592  12/1951  Pile ................................ 198/208 X
2,695,702  11/1954  Ellen ................................. 198/208

Primary Examiner—Richard A. Schacher
Assistant Examiner—James M. Slattery
Attorney, Agent, or Firm—Cushman, Darby and Cushman

[57] ABSTRACT

A stretch adjusting device for a conveyor in a conveyor-line working system is disclosed herein which comprises a pair of inside guide members, a pair of outside guide members, and members for simultaneously rocking these both pairs of guide members. The inside guide members are rotatably pivoted on an inside portion of an upper surface of a corner base at their respective outer end portions, and are provided with stepwise engaging sections at their respective outer end portions and also provided with arcuated channels for forming an inside conveyor track on their respective upper surfaces. The outside guide members are formed and arranged in a similar manner as said inside guide members, in that they are rotatably pivoted on an outside portion of the upper surface of said corner base at their respective outer end portions, and are provided with stepwise engaging sections at their respective outer end portions and also provided with arcuated channels for forming an outside conveyor track on their respective upper surfaces. Said rocking members serves to simultaneously rock said both pairs of guide members by an equal distance about their respective pivotal points.

1 Claim, 7 Drawing Figures

STRETCH ADJUSTING DEVICE FOR A CONVEYOR IN A CONVEYOR-LINE WORKING SYSTEM

BACKGROUND OF THE INVENTION

The present invention relates to a stretch adjusting device for a conveyor in a conveyor-line working system, in which two endless conveyors, especially two endless chain conveyors are provided in juxtaposition both inside and outside of a pallet conveying passageway, and in which pallets are conveyed along said conveying passageway by making use of friction between said inside and outside chain conveyors and said pallets.

Heretofore, such type of conveyor-line working systems have been constructed as shown in FIG. 1. In this figure, reference character $a$ designates a pallet conveying passageway formed in an endless shape as illustrated, reference character $b$ designates corner bases for supporting said conveying passageway $a$ at four corners thereof, and reference characters $c$ and $d$ designate tracks of inside and outside chain conveyors provided inside and outside, respectively, of said conveying passageway $a$. On these inside and outside tracks are respectively disposed chain conveyors (not shown) driven by a driving source, and pallets loaded on said chain conveyor are adapted to be conveyed along the conveying passageway $a$ in accordance with the movement of said inside and outside chain conveyors.

Upon adjusting stretch of the chain conveyors in the aforementioned conveyor-line working systems, the adjustment is performed by changing the lengths of the tracks for the chain conveyors through the step of shifting the corner bases $b$ as shown by double-dot chain lines in FIG. 1. However, if the corner bases $b$ are shifted in this way, then the tracks for the inside and outside chain conveyors are equally varied, and therefore, not only there was an inconvenience that the degrees of stretch of the inside and outside chain conveyors cannot be adjusted individually to an appropriate degree of stretch, but also there was a disadvantage that the shift of the corner bases $b$ required a lot of labor and was extremely difficult.

SUMMARY OF THE INVENTION

Therefore, it is an object of the present invention to provide a novel stretch adjusting device for a conveyor in a conveyor-line working system which is free from the above-described inconvenience and disadvantage.

According to one feature of the present invention, there is provided a stretch adjusting device for a conveyor in a conveyor-line working system, characterized in that said device comprises a pair of inside conveyor guide members, which are rotatably pivoted on an inside portion of an upper surface of a corner base at their respective outer end portions, and which have stepwise engaging sections at their respective inner end portions and also have arcuated channels for forming an inside conveyor track on their respective upper surfaces; a pair of outside guide members, which are rotatably pivoted on an outside portion of the upper surface of said corner base at their respective end portions, and which have stepwise engaging sections at their respective inner end portions and also have arcuated channels for forming an outside conveyor track on their respective upper surfaces; and means for simultaneously rocking said pair of inside conveyor guide members and said pair of outside conveyor guide members by an equal distance about their respective pivotal points.

BRIEF DESCRIPTION OF THE DRAWINGS

A preferred embodiment constituting the best mode presently contemplated for carrying out the invention is illustrated, together with an outline of the conventional conveyor stretch adjusting devices, in the accompanying drawings, in which.

DESCRIPTION OF PREFERRED EMBODIMENT

Now the present invention will be described in more detail with reference to FIGS. 2 through 7.

Figure 1:
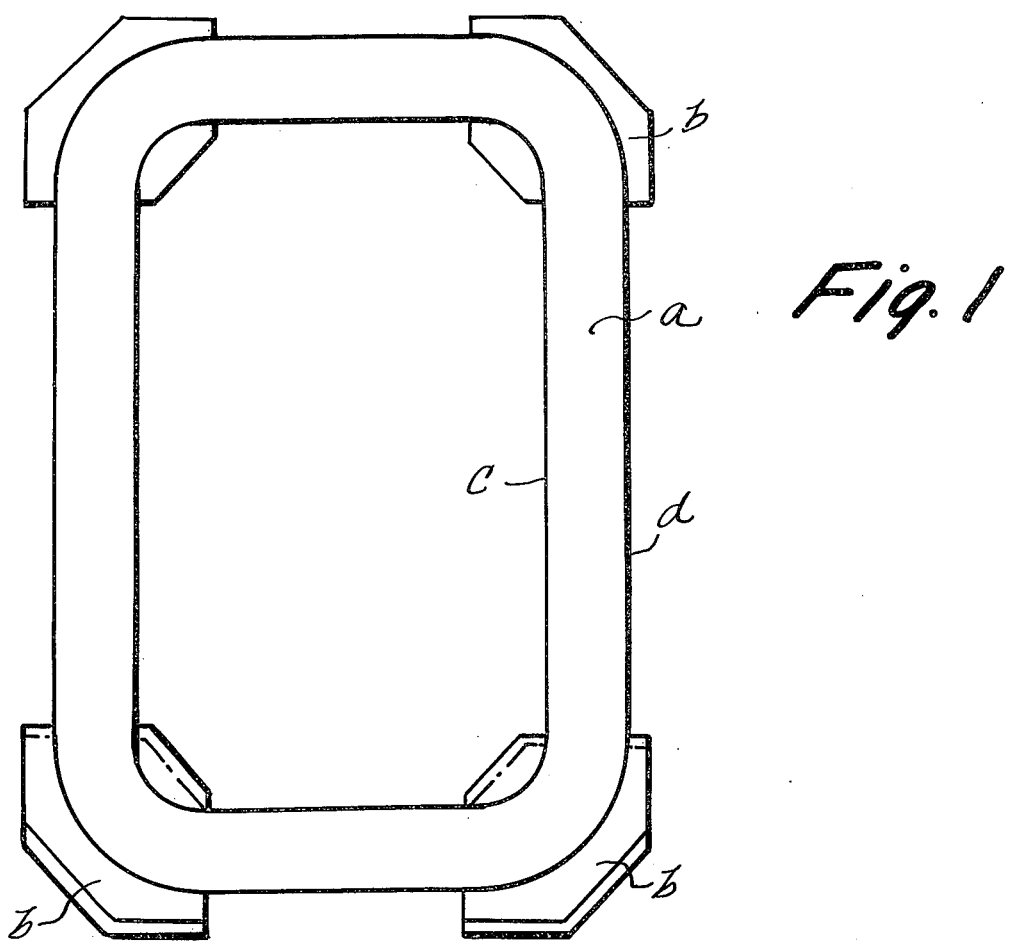
FIG. 1 is a schematic view showing an outline of a stretch adjusting device for a conveyor in the conventional conveyor-line working systems.
Figure 2:
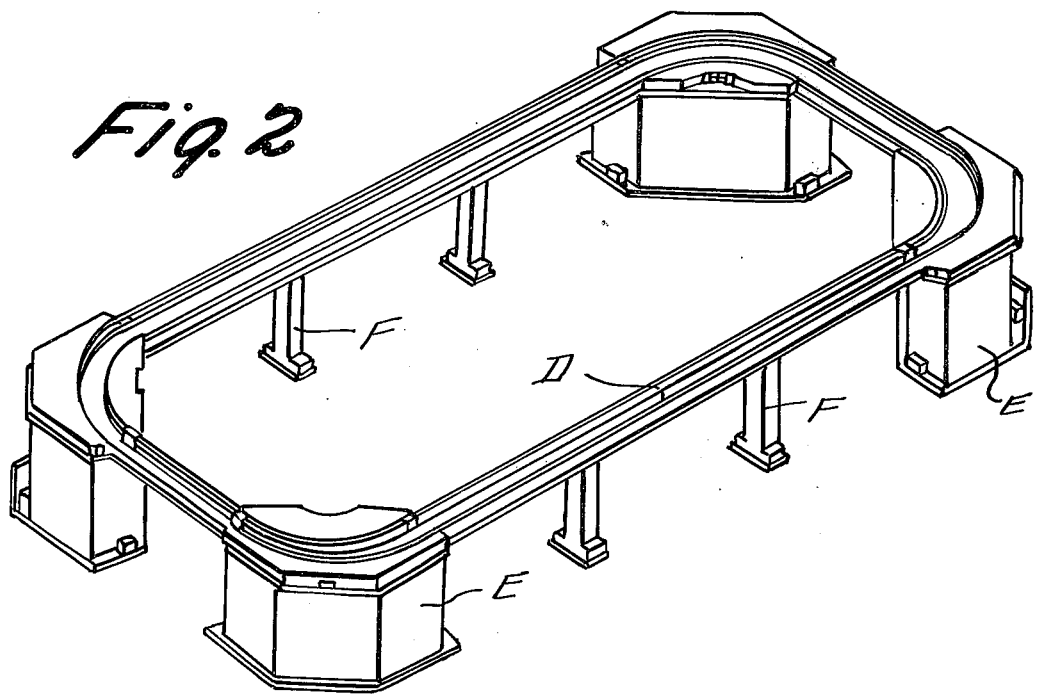
FIG. 2 is a general perspective view of a conveyor line working system to which the present invention is applied.

At first referring to FIG. 2 of the drawings, a conveyor-line working system employing the device according to the present invention is generally shown in a perspective form. In this figure, reference character D designates a pallet conveying passageway, reference character E designates corner bases for supporting said conveying passageway D at four corners thereof, and reference character F designates stanchions for supporting the conveying passageway D. The subject device according to the present invention is provided on each corner base E, and the details of said device are illustrated in FIGS. 3 to 7.

Figure 3:
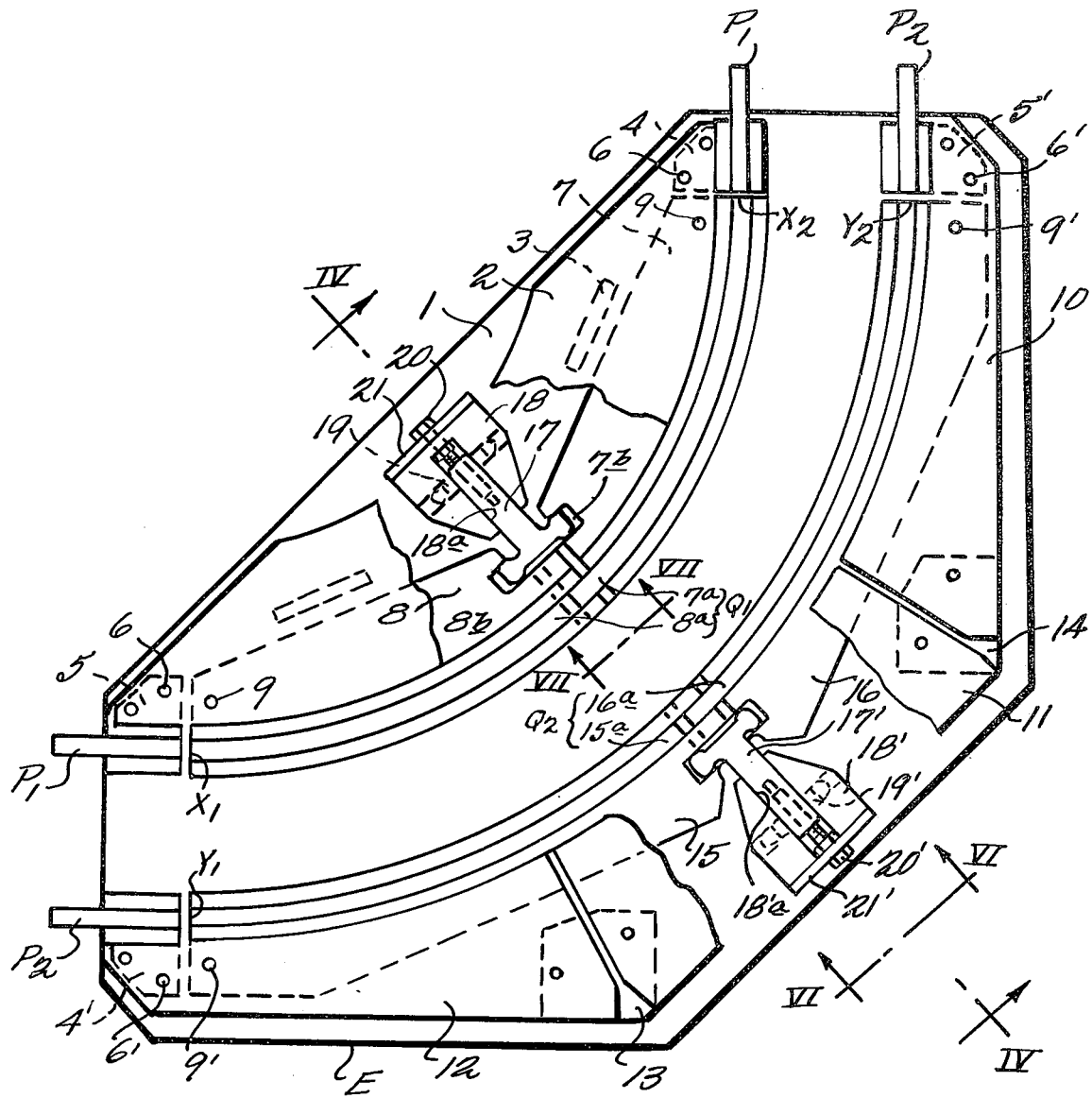
FIG. 3 is a plan view of the essential part.
Figure 4:
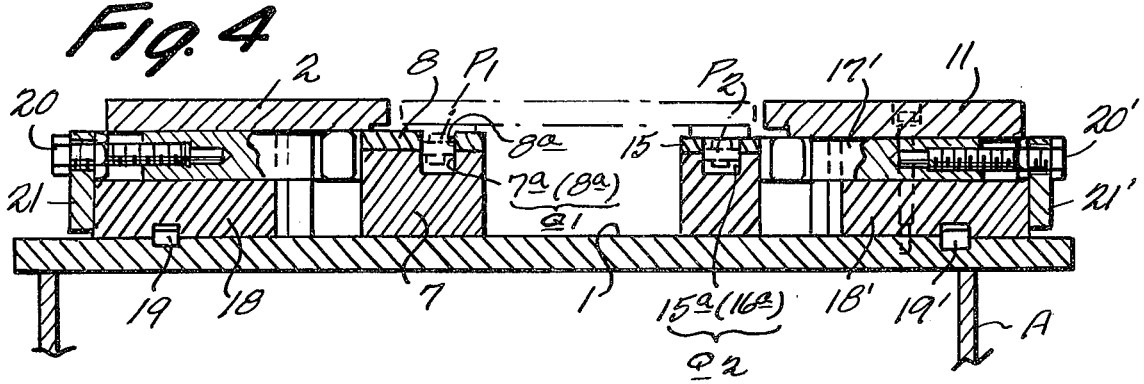
FIG. 4 is a cross-sectional view taken along line IV—IV in FIG. 3 as viewed in the direction of arrows.
Figure 5:
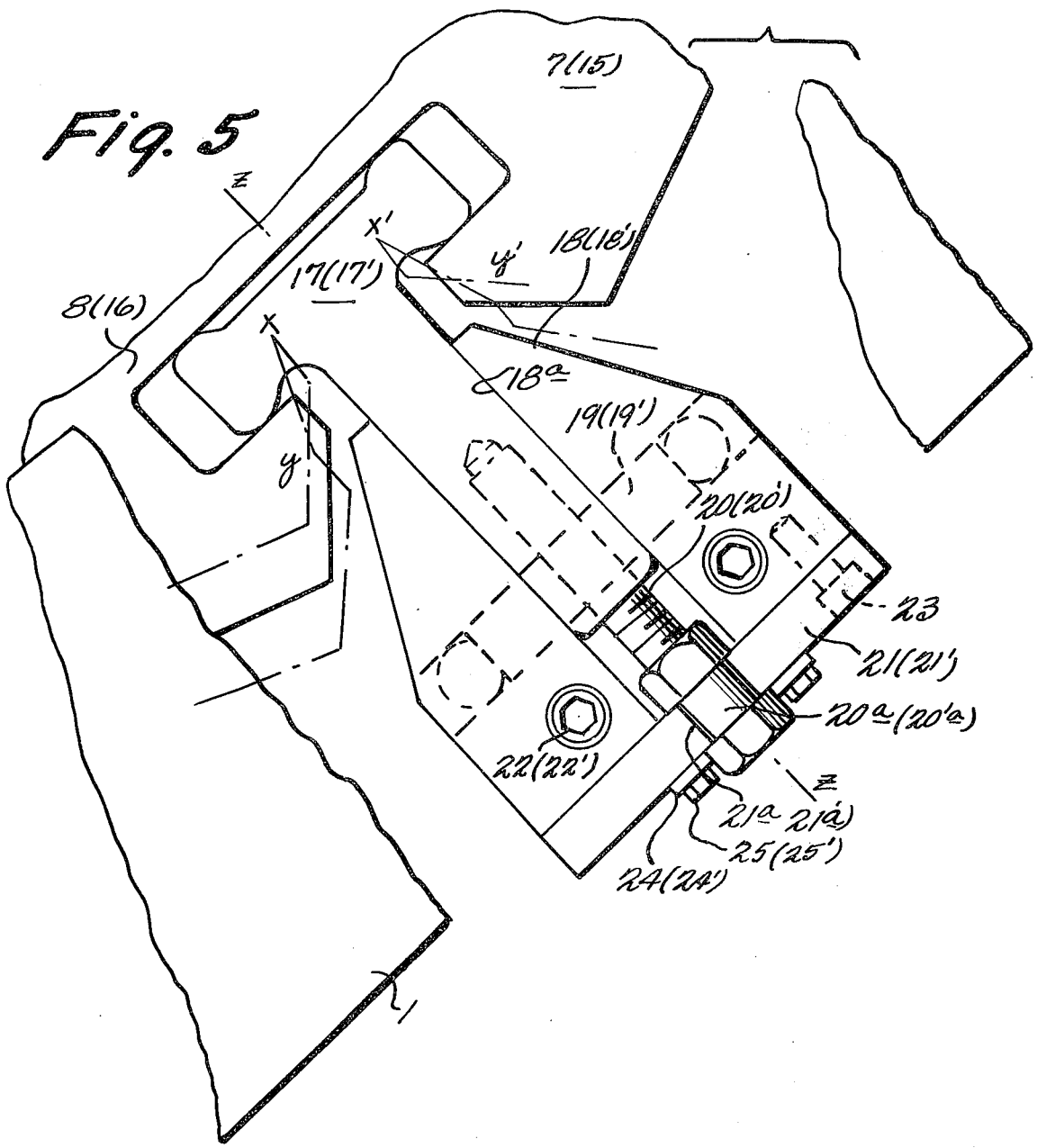
FIG. 5 is an enlarged plan view of a take-up screw and its associated members.
Figure 6:
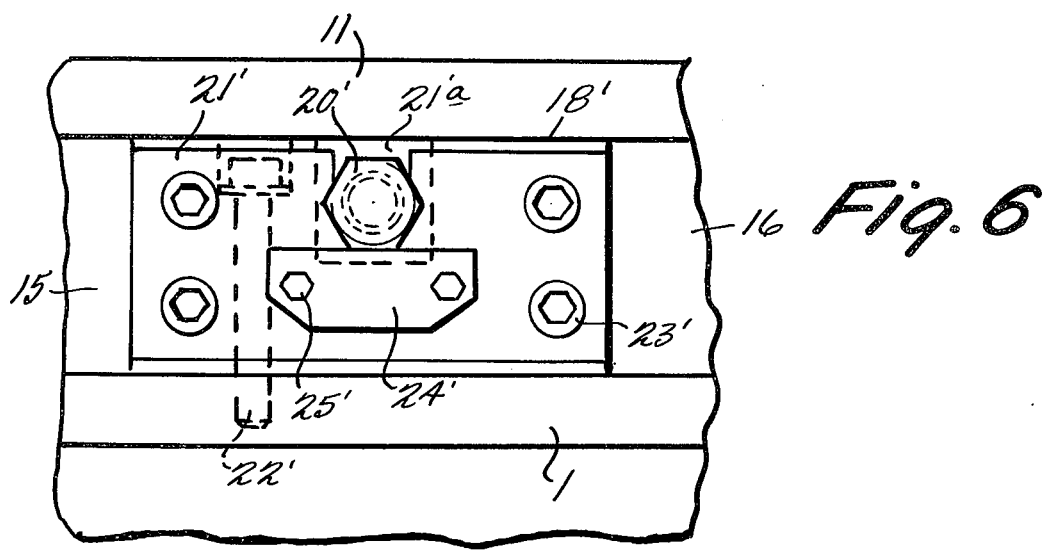
FIG. 6 is a partial side view partly in perspective form taken along line VI—VI in FIG. 3 as viewed in the direction of arrows.
Figure 7:
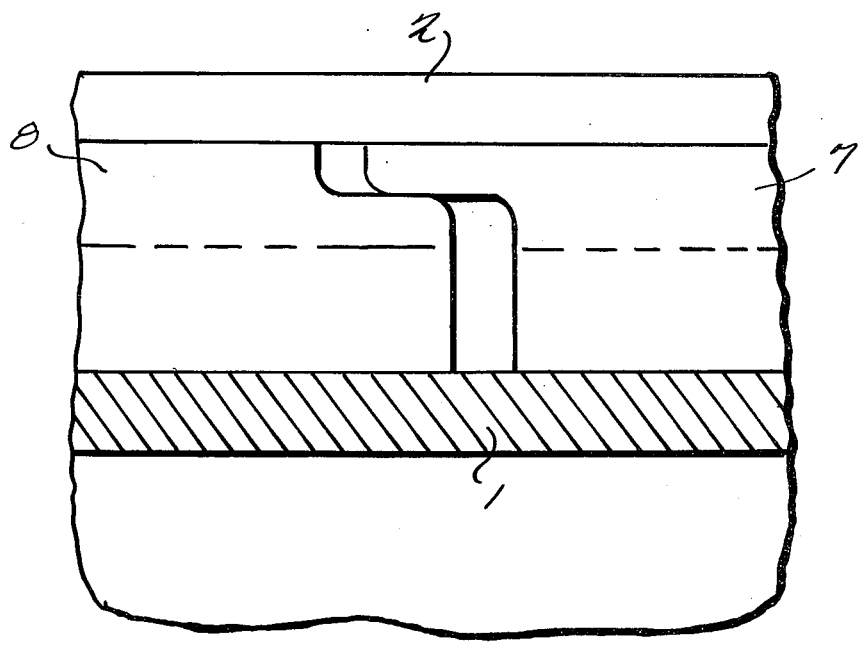
FIG. 7 is a partial side view partly in cross-section taken along line VII—VII in FIG. 3 as viewed in the direction of arrows, and FIGS. 2 through 7 above jointly illustrate one preferred embodiment of the present invention.

In FIGS. 3 through 7, reference numeral 1 designates an upper surface of the corner base E, reference numerals 7 and 8 represent a pair of inside chain conveyor guide members which are rotatably pivoted on an inside portion of the upper surface 1 of the corner base E at their respective outer end portions with pins 9 and whose respective inner end portions are engageable with each other in a stepwise manner as shown in FIG. 7, and on the upper surface of these pair of inside conveyor guide members 7 and 8 are provided arcuated channels 7a and 8a, respectively, communicating with each other, said channels 7a and 8a forming a guide track $Q_1$ for an inside chain conveyor $P_1$. Reference numeral 2 designates an inside pallet guide making contact with the upper surface of the inside conveyor guide members 7 and 8 and fixedly secured onto the upper surface 1 of the corner base E via risers 4 and 5, respectively, with bolts 6, numeral 18 designates an inside take-up housing fixedly secured onto the upper surface 1 of the corner base E with an inside portion key 19 on the upper surface 1 and bolts 22 so that its longitudinal axis may align with a center line Z—Z of the upper surface 1 as shown in FIG. 5, and in a grooved portions 18a of the inside take-up housing 18 is slidably fitted an inside take-up block 17. Reference numeral 21 designates a plate fixedly secured to an inside end of the inside take-up housing 18 with bolts 23 and provided with a notched portions 21a at its center, and in the notched portion 21a of the same plate 21 is fitted a stepped portion 20a of an inside take-up screw 20 (See FIGS. 5 and 6). On the other hand, a threaded portion of the inside take-up screw 20 at its tip end is screwed into the inside take-up block 17, and so, by turning the inside take-up screw 20 in the either normal or reverse direction the inside take-up block 17 can be advanced or retracted along the grooved portion 18a of the inside take-up housing 18 in its axial direction. As best seen in FIG. 5, a T-shaped portion of the inside take-up block 17 at its extremity is engaged with notched portions 7b and 8b provided at the inner end portions of the inside conveyor guide members 7 and 8, respectively. Accordingly, in response to the aforementioned advance or retraction of the inside take-up block 17, the inside conveyor guide members 7 and 8 are turned about the center pins 9 so that one corner point of the respective notched portions 7b and 8b may trace arcuated loci x—y and x'—y', respectively, as shown in FIG. 5, and these inside conveyor guide members are adapted to be rocked simultaneously by an equal distance. Reference numeral 24 designates a locking piece mounted to the plate 21 with bolts 25, and this locking piece 24 serves to prevent turning of the inside take-up screw 20 (See FIG. 6). Thus the above-described inside take-up block 17, inside take-up housing 18, inside take-up screw 20 and other associated members, jointly constitute means for simultaneously rocking the inside conveyor guide members 7 and 8 by an equal distance about the pins 9.

Reference numerals 15 and 16 represent a pair of outside chain conveyor guide members which are rotatably pivoted on an outside portion of the upper surface 1 of the corner base E at their respective outer end portions with pins 9' and which have arcuated channels 15a and 16a, respectively, on their upper surface 1 to form a guide track $Q_2$ for an outside chain conveyor $P_2$, numerals 15b and 16b designate notched portions of said guide members 15 and 16, numerals 17' designates an outside take-up block, numeral 18' designates an outside take-up housing, numeral 18'a designates a grooved portion of the outside take-up housing 18', numeral 19' designates a key, numeral 20' designates an outside take-up screw, numeral 21' designates a plate similar to the plate 21, numerals 22' and 23' designate bolts, numeral 24' designates a locking piece, and numeral 25' designates bolts. The construction and relative arrangement in structure of these members are similar to those of the aforementioned inside conveyor guide members 7 and 8, inside take-up block 17, inside take-up housing 18, inside take-up screw 20, plate 21, locking piece 24, and the above-described outside take-up block 17', outside take-up housing 18', outside take-up screw 20' and other associated members, jointly constitute means for simultaneously rocking the outside conveyor guide members 15 and 16 by an equal distance about the pin 9'. Reference numerals 10, 11 and 12 designate outside pallet guides making contact with the upper surfaces of the outside conveyor guide members 15 and 16 and fixedly secured onto the upper surface 1 of the corner base E via risers 4', 5', 13 and 14 with bolts 6' as shown in FIG. 3. In FIG. 4, reference character W represents a pallet to be conveyed by the subject conveyor system.

Since the subject stretch adjusting system is constructed as described above, upon adjusting the stretch of the inside and outside chain conveyors $P_1$ and $P_2$, the inside take-up screw 20 and the outside take-up screw 20' are appropriately turned in the normal and reverse directions, respectively, or vice versa. Then, the inside take-up block 17 advances and the outside take-up block 17' retracts, or vice versa, along the grooved portions 18a and 18'a of the inside and outside housing 18 and 18', so that the inside conveyor guide members 7 and 8 and the outside conveyor guide members 15 and 16 simultaneously rock by an equal distance about the pins 9 and 9', respectively, and thereby the length $\overline{X_1X_2}$ and $\overline{Y_1Y_2}$ (See FIG. 3) of the guide tracks $Q_1$ and $Q_2$, respectively, for the inside and outside chain conveyors $P_1$ and $P_2$, which tracks are formed by the grooved portions 7a and 8a of the guide members 7 and 8 and by the grooved portions 15a and 16a of the guide members 15 and 16, can be varied for adjustment of stretch. Accordingly, the degree of stretch of the inside chain conveyor $P_1$ and the outside chain conveyor $P_2$ disposed in these tracks $Q_1$ and $Q_2$, respectively, can be adjusted appropriately and independently of each other. In the illustrated embodiment, since the inner end portions of the pair of inside conveyor guide members 7 and 8 and of the pair of outside conveyor guide members 15 and 16 are engaged with each other in a stepwise manner, no discontinuity occurs along the guide tracks $Q_1$ and $Q_2$.

Because of the above-described construction of the stretch adjusting device according to the present invention, the invention provides the following practical effects and advantages:

1. Since the degree of stretch of the inside and outside chain conveyors $P_1$ and $P_2$ can be adjusted by changing the lengths of the guide tracks $Q_1$ and $Q_2$ of the chain conveyors $P_1$ and $P_2$ simply through manipulation of the take-up screws 20 and 20' without shifting the corner base as is the case with the prior art device, the operation for adjustment is far more simpler than that in the conventional devices, and consequently, the labor for assembling and adjustment of a conveyor-line working system can be greatly reduced.

2. Since the length of the guide track $Q_1$ for the inside chain conveyor $P_1$ and the length of the guide track $Q_2$ for the outside chain conveyor can be varied individually, and thus since the degree of stretch of the inside chain conveyor $P_1$ and the degree of stretch of the outside chain conveyor $P_2$ can be individually adjusted to any desired degree of stretch, the movement of the chain conveyors embodying the present invention becomes far smoother than that of the conventional chain conveyors.

In the above-described embodiment, the present invention has been described with respect to the case where inside and outside chain conveyors $P_1$ and $P_2$ are equipped in inner and outer guide tracks $Q_1$ and $Q_2$, respectively. However, it is a matter of course that the present invention is equally applicable to a conveyor-line working system employing other conveyors such as V-belts or similar conveyors.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A stretch adjusting device for a conveyor in a conveyor-line working system, characterized in that said device comprises a pair of inside conveyor guide members, which are rotatably pivoted on an inside portion of an upper surface of a corner base at their respective outer end portions, and which have stepwise engaging sections at their respective inner end portions and also have arcuated channels for forming an inside conveyor track on their respective upper surfaces; a pair of outside guide members, which are rotatably pivoted on an outside portion of the upper surface of said corner base at their respective outer end portions, and which have stepwise engaging sections at their respective inner end portions and also have arcuated channels for forming an outside conveyor track on their respective upper surfaces; and means for simultaneously rocking said pair of inside conveyor guide members and said pair of outside conveyor guide members by an equal distance about their respective pivotal points.

* * * * *